United States Patent
Preuss et al.

(10) Patent No.: US 6,292,457 B1
(45) Date of Patent: Sep. 18, 2001

(54) RECORDABLE OPTICAL MEDIA WITH A SILVER-GOLD REFLECTIVE LAYER

(75) Inventors: Donald R. Preuss; Michael P. Cunningham, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/281,889

(22) Filed: Mar. 31, 1999

(51) Int. Cl.$^7$ ........................................................ G11B 7/24
(52) U.S. Cl. ........................................ 369/275.2; 428/64.4
(58) Field of Search .............................. 369/275.2, 283, 369/284, 288; 428/64.1, 64.4, 457, 913; 430/495.1, 945, 270.11

(56) References Cited

U.S. PATENT DOCUMENTS

| | | |
|---|---|---|
| 4,577,291 | 3/1986 | Cornet . |
| 4,638,335 * | 1/1987 | Smith et al. ...................... 346/135.1 |
| 5,009,818 | 4/1991 | Arai et al. . |
| 5,075,147 | 12/1991 | Usami et al. . |
| 5,079,135 | 1/1992 | Matsuzawa et al. . |
| 5,080,946 | 1/1992 | Takagisi et al. . |
| 5,090,009 | 2/1992 | Hamada et al. . |
| 5,415,914 | 5/1995 | Arioka et al. ............................ 428/64 |
| 5,479,382 * | 12/1995 | Nishida et al. .................... 369/275.1 |
| 5,492,744 | 2/1996 | Koike et al. . |
| 5,591,500 * | 1/1997 | Kawanishi ........................... 428/64.1 |
| 5,640,382 * | 6/1997 | Florczak et al. .................. 369/275.1 |
| 5,646,273 | 7/1997 | Oguchi et al. . |
| 5,773,193 | 6/1998 | Chapman et al. .............. 430/270.13 |
| 5,871,881 * | 2/1999 | Nishida et al. .................. 430/270.11 |
| 5,942,302 * | 8/1999 | Ha et al. .............................. 428/64.1 |
| 6,007,889 * | 12/1999 | Nee ..................................... 428/64.1 |

FOREIGN PATENT DOCUMENTS

| | | |
|---|---|---|
| 0 046 569 A | 1/1991 | (EP) . |
| 0 600 427 A | 6/1994 | (EP) . |

\* cited by examiner

Primary Examiner—Tan Dinh
(74) Attorney, Agent, or Firm—J. Jeffrey Hawley

(57) ABSTRACT

There is disclosed an optical recording media having a transparent substrate; a dye recording layer containing a metal complex of a porphym or phthalocyanine dye on said transparent substrate; a reflective layer provided on said dye layer wherein the reflective layer which is a mixture of silver and gold in such proportions that the gold is between about 0.5 and 15 atomic percent of said mixture; and a protective layer formed over said reflective layer. In accelerated keeping tests, the media of the invention exhibits excellent stability.

10 Claims, No Drawings

RECORDABLE OPTICAL MEDIA WITH A SILVER-GOLD REFLECTIVE LAYER

FIELD OF THE INVENTION

This invention relates generally to optical media and, more particularly, to the reflecting layer typically found on recordable optical media.

DESCRIPTION RELATIVE TO THE PRIOR ART

Recordable optical media such as recordable compact disks (CD-R) and recordable digital versatile disks (DVD-R), that is data disks upon which information can be written after the manufacture thereof, are known. The media is usually in the form of a disk but can be in other forms such as optical tape or optical data cards. Recordable optical media typically have a transparent substrate, a dye containing recording layer is disposed on top of the substrate, a reflective layer is formed on top of the dye layer, and a protective layer is formed on top of the reflective layer. The transparent substrate typically has a groove on its surface. Embossing or injection molding can form the groove.

It is known to provide a dye containing recording layer wherein the dye is a metallized phthalocyanine dye. Reference is made to U.S. Pat. 5,646,273 assigned to Mitsui Toatsu Chemicals, Inc. It is also known to provide a stabilizer for such a layer as is described in U.S. Pat. No. 5,492,744 also assigned to Mitsui Toatsu Chemicals, Inc.

Typical recordable optical media use a thin layer of gold as the reflective layer. (CD-ROM or "stamped" CDs often have an aluminum reflective layer. However, since a recordable CD requires that the light pass through the dye containing recording layer during writing and reading, a higher reflectivity material, such as gold, is needed for a recordable CD.) The gold reflective layer exhibits both high stability and high reflectivity. However, gold is expensive and has recently been replaced by silver by a number of CD-R manufacturers. Silver, in addition to being much less expensive, also has a slightly higher reflectivity at the wavelength of light used by CD readers and writers. However, silver is also known to be more reactive than gold. We have found that in accelerated keeping tests, recordable CDs with silver reflective layers often display less than desired stability. Trade journals have indicated that many customers have concerns over the expected lifetime of recordable optical disks with silver reflective layers. A benchmark test of the stability of optical media is the length of time which media with data recorded on them can survive in a high temperature and humidity environment. A condition frequently selected by testers is 80° C. and 85% relative humidity. Typically, media fabricated with 100% silver as the reflective layer will work well initially but will fail this incubation condition in a time much less than media with a gold reflective layer.

In U.S. Pat. No. 5,415,914, there is described an optical recording disk having two reflecting layers. The lower layer can be "silver, gold and alloys thereof". However, we have found that silver and gold alloys do not work with all dye containing recording layers. In fact, the reflective layers of the present invention have been tested on the layers described in U.S. Pat. No. 5,773,193 of the present assignee. The described incubation tests with the reflective layer described in this specification cause this media to fail. Other references, including those of the present assignee, also indicate that gold-silver alloys can be used but give no guidance regarding useful reflective layers that will withstand incubation.

It would be desirable to develop optical media, such as CD-R or DVD-R, with a reflective layer that would have the reduced price of silver, the high reflectivity of both silver and gold, and a stability much greater than is provided by a pure silver reflective layer.

SUMMARY OF THE INVENTION

The present invention provides a dye-based recordable optical medium such as CD-R and DVD-R with an improved reflective layer which has a reflectivity comparable to gold or silver, a cost substantially less than gold, and a stability substantially greater than pure silver.

In accordance with the present invention, there is provided recordable optical media comprising:

a) a transparent substrate;

b) a dye recording layer containing a metal complex of a porphym or phthalocyanine dye on said transparent substrate;

c) a reflective layer on said dye recording layer wherein the reflective layer comprises a mixture of silver and gold in such proportions that the gold comprises between about 0.5 and 15 atomic percent of said mixture; and d) a protective layer on said reflective layer.

The combination of a recording layer containing a metal complex of a porphyrin or phthalocyanine type dye with the particular reflective layer provides the desired cost savings and stability.

DETAILED DESCRIPTION OF THE INVENTION

The invention will be described in particular reference to CD-R media and disks but it will be understood that the invention is equally applicable to DVD-R disks and other dye-based recordable optical media as well.

Recordable optical media includes a transparent substrate with a dye-containing recording layer (sometimes referred to simply as a "dye recording layer"), a reflective layer, and a protective layer (or layers). Fabrication of the recordable media begins with a transparent substrate which is typically polycarbonate, formed by injection molding most often with a spiral groove embossed in one surface in the manner of commercially available CD-R's.

The substrate may be any transparent material that satisfies the mechanical and optical requirements. The substrate is generally pregrooved with groove depths from 20 nm to 250 nm, groove widths 0.2 to 1 $\mu$m and a pitch 0.5 to 2$\mu$m. As noted, the preferred material is polycarbonate. Other useful materials include glass, polymethylmethacrylate and other suitable polymeric materials.

In accordance with the present invention, the dye-containing recording layer contains a metal complex of a porphyrin or phthalocyanine dye. Suitable dyes are illustrated in Formulas I and II below;

Formulas I and II

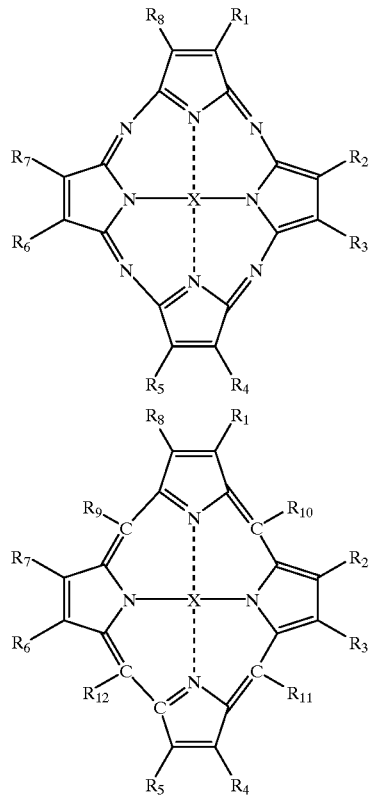

Formula III-IV

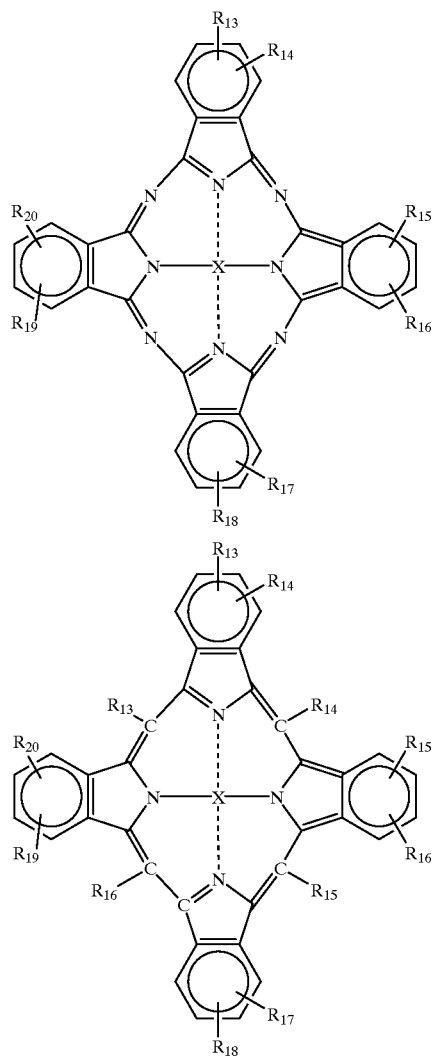

wherein

X represents a metal selected from the group consisting of Mg, Al, Si, Ti, V, Mn, Fe, Co, Ni, Cu, Zn, Ga, Pd, Sn and Pb. The metals Mg, Si, V, Zn and Pd are preferred;

the R groups (1 through 12) can be the same or different and can independently be selected from hydrogen or alkyl of 1–12 carbon atoms or cycloalkyl of 6–10 carbon atoms or aryl of 6–10 carbon atoms or allyl or such alkyl, cycloalkyl, aryl and allyl groups substituted with one or more groups chosen from hydroxy, acyloxy, alkoxy, aryloxy, alkylthio, arylthio, alkylsulfonyl, arylsulfonyl, alkylaminosulfonyl, arylaminosulfonyl, thiocyano, cyano, nitro, halogen, alkoxycarbonyl, aryloxycarbonyl, acetyl, aroyl, alkylaminocarbonyl, arylaminocarbonyl, alkylaminocarbonyloxy, arylaminocarbonyloxy, acylamino, amino, alkylamino, arylamino, carboxy, sulfo, trihalomethyl, alkyl, aryl, substitiuted aryl, hetaryl, or substituted hetero aryl, alkylureido, arylureido, succinimido, phthalimido or, any two of the R groups located on adjacent ring carbons may be combined together to form a 5- or 6-membered saturated or unsaturated (aromatic) hetero- or carbocyclic ring, for example $R_1$ and $R_8$, $R_2$ and $R_3$, $R_4$ and $R_5$ and $R_5$ and $R_6$ may form a fused ring leading to the dyes of Formula III–IV;

wherein

X represents a metal and is selected from the group consisting of Mg, Al, Si, Ti, V, Mn, Fe, Co, Ni, Cu, Zn, Ga, Pd, Sn and Pb. Metals Mg, Si, V, Zn and Pd are preferred;

the R groups (13 through 20) can be the same or different and can independently be selected from hydrogen or alkyl of 1–12 carbon atoms or cycloalkyl of 6–10 carbon atoms or aryl of 6–10 carbon atoms or allyl or such alkyl, cycloalkyl, aryl and allyl groups substituted with one or more groups chosen from hydroxy, acyloxy, alkoxy, aryloxy, alkylthio, arylthio, alkylsulfonyl, arylsulfonyl, alkylaminosulfonyl, arylaminosulfonyl, thiocyano, cyano, nitro, halogen, alkoxycarbonyl, aryloxycarbonyl, acetyl, aroyl, alkylaminocarbonyl, arylaminocarbonyl, alkylaminocarbonyloxy, arylaminocarbonyloxy, acylamino, amino, alkylamino, arylamino, carboxy, sulfo, trihalomethyl, alkyl, aryl, substitiuted aryl, hetaryl, or substituted hetero aryl, alkylureido, arylureido, succinimido, phthalimido or, any two of the R groups located on adjacent ring carbons may be combined together to form a 5- or 6-membered saturated or unsaturated (aromatic) hetero- or carbocyclic ring, for example the R groups of Formula III may again form fused aromatic rings, i.e., $R_{13}$ and $R_{14}$, $R_{15}$ and $R_{16}$, $R_{17}$ and $R_{18}$ and $R_{19}$ and $R_{20}$ may form a fused ring leading to the dyes of Formula V–VI, Formula V-VI

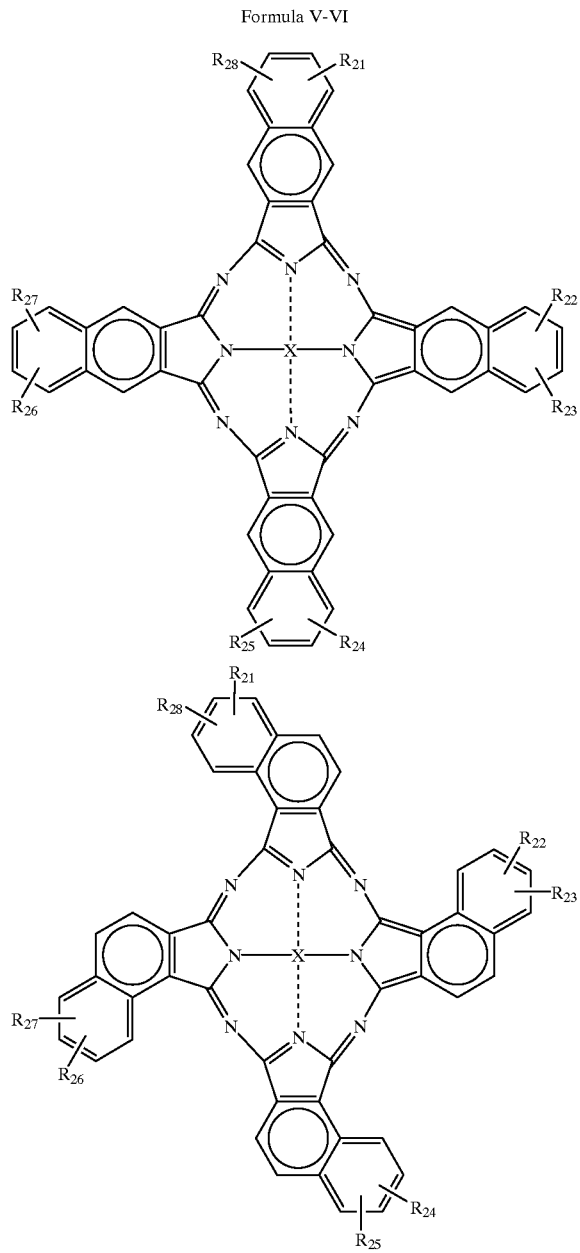

wherein

X represents a metal selected from the group consisting of Mg, Al, Si, Ti, V, Mn, Fe, Co, Ni, Cu, Zn, Ga, Pd, Sn and Pb. The metals Mg, Si, V, Zn and Pd are preferred; the R groups (21 through 28) can be the same or different and can independently be selected from hydrogen or alkyl of 1–12 carbon atoms or cycloalkyl of 6–10 carbon atoms or aryl of 6–10 carbon atoms or allyl or such alkyl, cycloalkyl, aryl and allyl groups substituted with one or more groups chosen from hydroxy, acyloxy, alkoxy, aryloxy, alkylthio, arylthio, alkylsulfonyl, arylsulfonyl, alkylaminosulfonyl, arylaminosulfonyl, thiocyano, cyano, nitro, halogen, alkoxycarbonyl, aryloxycarbonyl, acetyl, aroyl, alkylaminocarbonyl, arylaminocarbonyl, alkylaminocarbonyloxy, arylaminocarbonyloxy, acylamino, amino, alkylamino, arylamino, carboxy, sulfo, trihalomethyl, alkyl, aryl, substitiuted aryl, hetaryl, or substituted hetero aryl, alkylureido, arylureido, succinimido, and phthalimido. In accordance with the usual chemical convention, the non-localized R groups on any of the naptho rings of Formulae V and VI can be connected to either of the rings attached to the pyrrole, i.e. both groups to the ring alpha to the pyrrole, both to the beta ring or one group to each ring. In Formulae V and VI for simplicity, only the so-called napthalocyanine ring structure is shown although similar napthaloporphyrins are understood.

The R groups of Formulas I–VI are those commonly employed in the art so as to generate dyes useful for the CD recordable application. Especially preferred are phthalocyanine dyes of Formulas III–IV wherein the R groups are alkoxy and bromo and the metal is Pd and napthalocyanine dyes of Formula V–VI wherein the R groups are alkoxy and the metal is Zn.

The dye containing recording layer is typically formed by dissolving the dye or dye mixture (and addenda where applicable), in an organic solvent and then spin coating the solution onto the transparent substrate. For coating, the dye mixture, with or without addenda, is preferably dissolved in a suitable solvent such that the dye is 20 or less parts by weight to 100 parts of solvent by volume.

Coating solvents for the dye containing recording layer are selected to minimize their effect on the substrate. Useful solvents include hydrocarbons, substituted cycloalkanes, alcohols, ethers, hydrocarbon halides, cellosolves, and ketones. Examples of solvents are ethylcyclohexane, 2,2,3,3-tetrafluoropropanol, tetrachloroethane, dichloromethane, dioxane, methyl cellosolve, ethyl cellosolve, 1-methoxy-2-propanol, 4-hydroxy-4-methyl-2-pentanone. Preferred solvents are hydrocarbons and alcohols since they have the least effect on the preferred polycarbonate substrates. Mixtures containing these solvents can also be used. A particularly useful solvent mixture is ethylcyclohexane and dioxane at a ratio by weight of 9:1.

Useful addenda for the dye-containing recording layer include stabilizers, surfactants, binders and diluents. Preferred addenda for the metallized phthalocyanine dye-recording layer are described in U.S. Pat. No. 5,492,744 mentioned above. The currently preferred addendum is benzoylferrocene in an amount between about 2% and 12% by weight of said dye-containing recording layer.

In accordance with the present invention, the reflective layer comprises a mixture of silver and gold, which is applied by vacuum deposition, preferably dc magnetron sputtering. The reflective layer can be comprised of two or more lamina so long as the lamina or layer in contact with the dye containing recording layer has the composition of gold and silver as described.

Application of the reflective layer of the invention may be achieved by co-depositing silver and gold simultaneously from two independently controlled sources each containing one of the pure metals or it may be achieved by depositing from a single source containing a mixture of the two metals. In the case of dual sources, it is desirable to rotate the dye-coated substrate (for example at about 300 rpm) in order to insure a uniform mixture of the two metals in the reflective layer. In addition to dc magnetron sputtering, the layer of the invention can be applied by any method of vacuum deposition.

The mixture of silver and gold is in such proportions that the gold comprises between about 0.5 and 15 atomic percent, more preferably between 1.0 and 15 atomic percent, of said mixture while the remainder is silver. While mixtures over the entire atomic percent range from 0 to 100 percent provide workable reflective layers as the literature describes, below about 0.5 atomic percent, the keeping stability is less than desired. This is shown in the examples below. The upper limit of about 15 atomic percent is dictated by economic concerns. The preferred reflective layer comprises of a mixture of about 97.8 atom percent silver and about 2.2 atom percent gold.

The reflective layer is coated to a thickness such that the reflectivity of the reflective layer at the read wavelength (780 nm for CD-R, 630–650 nm for DVD-R) is at least 95% of the reflectivity for an optically opaque film (substantially no light transmission). It is preferred that the reflective layer be coated to a thickness of at least 500 angstroms.

Over the reflective layer is a protective layer. The protective layer can comprise a number of lamina or layers. The protective layer can comprise what is generally referred to in this art as a lacquer. The lacquer for the protective layer may be one of many UV curable materials also used in the manufacture of audio CD's as well as CD-R's, and is applied by spin coating, followed by a brief exposure to intense UV light to effect curing of the material.

One preferred protective layer is disclosed in U.S. Pat. No. 5,312,663. This patent discloses a two-layer structure in which the layer adjacent to the reflective layer is spin coated and the second layer is screen-printed.

The media of the invention can have prerecorded ROM areas as described in U.S. Pat. No. 4,940,618. The surface of the substrate can have a separate heat deformable layer as described in U.S. Pat. No. 4,990,388. Other patents relating to recordable CD type elements are U.S. Pat. Nos. 5,009,818; 5,080,946; 5,090,009; 4,577,291; 5,075,147; and 5,079,135.

Analytical Methodology for Determining Stability

There are four methods for analyzing media before and after incubation. The first method is by microscopy. The samples are viewed through the substrate using infrared light. (In a CD reader, the disk is read through the substrate using infrared light.) Under high magnification, the incubated media show small dark features typically 1 μmor less in size. These features are suspected to be corrosion, although there is no evidence that a corrosion process forms them. The exact mechanism is not relevant. What is clear is that these small dark features are unwanted and affect the performance of the media.

The second analytical method involves writing on the media with a CD writer, and then reading the information back in a CD reader. Every second, the number of data blocks, which are in error, is logged. This is called the block error rate (BLER). The average value of BLER for a partially or fully written disk is called BLERavg. The CD-R specification requires that BLER never exceed 220. Commercially available disks typically have BLERavg values in the range of 0 to 10.

The third analytical method requires that unwritten media be placed in a modified disk reader. The data signal for an unwritten disk should be a constant signal. Due to small defects (such as the small dark features mentioned above) the actual data signal contains "drop outs", where the signal falls below a threshold relative to the average signal. The threshold designating a "drop out" is set to a value such that the frame defect rate (FDR) is comparable to the block error rate (BLER) which would be measured on the same piece of media after it has been written with data. "Corrosion" type defects can cause an increase in FDR and FDRavg.

The fourth analytical method is very similar to FDR. Frequently, very small defects can be observed in microscopy, but are to small to cause an increase in BLER or FDR. It is useful to know about these very small defects, since they frequently predict the ultimate failure of the media after additional incubation. Small defects can be detected by using a threshold closer to the signal average than what is used in detecting FDR. This makes the system more sensitive. This detection method is called sub micron micro-contamination (SMMS). An elevated SMMS value does not necessarily equate to failure of the media, but does indicate that deterioration of the media has taken place.

The following examples are presented for an understanding of preparing CD-R's with silver-gold reflective layers, and the subsequent performance of such disks.

EXAMPLES 1–5

A set of CD-R substrates were coated with a standard layer of a phthalocyanine dye containing 8.65% benzoyl-ferrocene which if coated with a gold reflector would constitute a typical CD-R available commercially. These disks were sequentially installed in a vacuum chamber in which a small dc magnetron sputter gun equipped with a 2 inch gold target, and one equipped with a 2 inch silver target were present. The disks were located approximately 2 inches in front of the guns, such that the guns were directed midway between the center of the disk, and the outer edge of the disk. The disk was then rotated at 300 rpm so that the materials deposited from each gun were well mixed in the resulting film. The chamber was fed with argon gas at a rate of 20 standard cubic centimeters per minute (sccm), resulting in a pressure of approximately 10 mTorr. The deposition of the reflective layer required 15 seconds, and the total power to the two guns was 350 Watts. The power to the gold gun was set to 6 different levels, giving 6 different compositions for the reflective layer. The 12 metallized disks were then coated with a protective lacquer, and UV cured. Table 1 summarizes the disks that were fabricated in the above manner. The atom percent compositions were obtained by assuming that the sputter yield of gold and silver is 2.0 and 2.7 respectively. (John L Vossen, Werner Kern, *Thin Film Process,* Academic Press Inc., p. 514, (1978)

TABLE 1

| Example | Ag power | Au power | Power % Au | Atom % Au |
| --- | --- | --- | --- | --- |
| comparison | 350.0 W | 0.0 W | 0% | 0.0% |
| 1 | 346.5 W | 3.5 W | 1% | 0.7% |
| 2 | 343.0 W | 7.0 W | 2% | 1.5% |
| 3 | 336.0 W | 14.0 W | 4% | 3.0% |
| 4 | 322.0 W | 28.0 W | 8% | 5.9% |
| 5 | 294.0 W | 56.0 W | 16% | 11.9% |

(Several sets of disks were made at the described conditions for testing using different analytical methods.) One set of six disks were all placed in a Kodak PCD-600 CD writer, and written at twice normal (2×) CD speed for the first 12% of media beginning at the inner end of the spiral groove. The other set of six disks remained unwritten.

The six written disks behaved as normal CD-R media. The written disks were measured for BLERavg, and the unwritten disks were measured for FDRavg and SMMSavg. This process was repeated after 1 week, and 3 weeks incubation at 80° C. and 85% relative humidity. BLERavg was also measured after 6 weeks total incubation. Table 2 shows the microscopic analysis of both the partially written (first set) and unwritten (second set) disks after 1 and 3 weeks. Small differences between the results of the two sets are believed to be due to the experimental variability of the fabrication and incubation process and not due to the actual writing on the media.

TABLE 2

| Example | Atom % Au | 1 week incubation | 3 weeks incubation |
|---|---|---|---|
| Comparison | 0.0% | OK | corrosion |
| 1 | 0.7% | OK | light corrosion |
| 2 | 1.5% | OK | light corrosion |
| 3 | 3.0% | OK | light corrosion |
| 4 | 5.9% | OK | very light corrosion |
| 5 | 11.9% | OK | OK |
| Set 2 | | | |
| Comparison | 0.0% | OK | corrosion |
| 1 | 0.7% | OK | light corrosion |
| 2 | 1.5% | OK | light corrosion |
| 3 | 3.0% | OK | light corrosion |
| 4 | 5.9% | OK | very light corrosion |
| 5 | 11.9% | OK | OK |

There is a direct correlation between the level of gold in the reflective layer, and resistance to corrosion. Table 3 shows the frame defect rate measured on the unwritten disks.

TABLE 3

| | | FDR avg | | |
|---|---|---|---|---|
| Example | Atom % Gold | 0 week | 1 week | 3 week |
| Comparison | 0.0% | 2.8 | 3.1 | na |
| 1 | 0.7% | 3.5 | 4.7 | 40.4 |
| 2 | 1.5% | 5.4 | 6.1 | 8.6 |
| 3 | 3.0% | 3.1 | 3.7 | 2.7 |
| 4 | 5.9% | 3.0 | 3.0 | 3.4 |
| 5 | 11.9% | 3.6 | 3.1 | 3.6 |

(The comparison disk after two weeks was damaged due to handling, and only partial test data was available.) The FDR data show that there is a benefit to keeping the gold level above 1 to 1.5 atom percent in order to achieve best results after 3 weeks. Now turn to the more sensitive probe of SMMS.

TABLE 4

| | | SMMS avg | | |
|---|---|---|---|---|
| Example | Atom % Gold | 0 week | 1 week | 3 week |
| Comparison | 0.0% | 7.4 | na | na |
| 1 | 0.7% | 8.3 | 87.2 | >999 |
| 2 | 1.5% | 10.9 | 47.5 | >999 |
| 3 | 3.0% | 7.4 | 4.3 | 125.1 |
| 4 | 5.9% | 7.5 | 7.5 | 17.6 |
| 5 | 11.9% | 8.9 | 11.1 | 10.5 |

It is much more apparent at the SMMS level of detection that the higher gold content plays an important role in improving the stability of the CD-R media. The most important parameter is BLER, since this directly impacts the end user. These data were measured on the partially written set of disks.

TABLE 5

| | | BLER avg | | | |
|---|---|---|---|---|---|
| Example | Atom % Gold | 0 week | 1 week | 3 week | 6 week |
| Comparison | 0.0% | 2 | 22 | 340 | 967 |
| 1 | 0.7% | 3 | 4 | 18 | 61 |
| 2 | 1.5% | 2 | 2 | 7 | 18 |
| 3 | 3.0% | 2 | 2 | 6 | 21 |
| 4 | 5.9% | 3 | 2 | 3 | 4 |
| 5 | 11.9% | 2 | 1 | 1 | na |

Here it is clear that pure silver has failed after 1 week. Three-week survival can be obtain with as little as 1.5% gold, and 6 week survival can be obtained with only 6% gold. A preferred embodiment of the silver-gold reflective layer would be 4% by weight gold, which would be 2.2 atomic percent gold. This represents a reasonable compromise between cost and stability.

EXAMPLE 6–8

A single sputter target of diameter 6 inches was fabricated from 97.8% silver and 2.2% (atom percent). A second target of 100% silver was also fabrication. (Examples 6–8 represent replicates)

Disks were dye coated in an identical manner as in the previous examples. Reflective layers were applied to the disks using each of the aforementioned sputtering targets using the same production parameters used for a typical gold coating. The energy required to sputter the silver and silver-gold films were altered from that for pure gold in order to maintain the same minimum optical density (1.93 @ 633 nm) in the groove area of the CD-R disk. Two silver disks and three silver-gold disks were finished with protective lacquer, and written over the full surface on a 2x speed writer. The disks were tested for BLER avg over the entire surface of the disk, and incubated at 80° C. and 85% relative humidity 80° C. and 85% relative humidity. Table 6 reports the results of the incubation and testing experiment.

TABLE 6

| | Composition of Reflective | BLER avg | | | |
|---|---|---|---|---|---|
| Example | Layer | 0 week | 1 week | 3 week | 6 week |
| 6 | 97.8% Ag/ 2.2% Au | 2.1 | 2.2 | 4.6 | 9.4 |
| 7 | 97.8% Ag/ 2.2% Au | 2.2 | 2.5 | 4.5 | 7.6 |
| 8 | 97.8% Ag/ 2.2% Au | 2.3 | 2.3 | 4.5 | 8.0 |
| Comparison | 100% Ag | 2.1 | 13.4 | not done | not done |
| Comparison | 100% Ag | 2.2 | 21.2 | not done | not done |

It is apparent that the small amount of gold added to the silver reflective layer is capable of extending the lifetime of the CD-R media at the storage condition of 80° C. and 85% relative humidity. This result is strong evidence that such media will have a much greater archival lifetime when stored under recommended conditions in the field.

EXAMPLE 9–11

Dye was coated onto some grooved substrates in a manner identical to the disks prepared in Examples 6–8, except that the 8.65% benzoylferrocene was not incorporated into the phthalocyanine dye. These disks were coated with the 97.8% Ag/2.2% Au reflective layer described in Examples 6–8. Benzoylferrocene is known to improve linearity in the recorded marks, as described in U.S. Pat. No. 5,492,744. Two of the more difficult parameters to maintain with this phthalocyanine are the "11T mark deviation" and the "11T land jitter". These quantities are expected to be greater than –60 ns and less than 35 ns respectively at all regions of the disk, when written at beta of 0% to 8%. (beta is proportional to write power. All of these quantities relate to the CD-R specifications, and are therefore known to those skilled in the art.) Disks made with and without the benzoylferrocene additive were tested for 11 T mark deviation and 11T land jitter when freshly prepared, and after 1 week of incubation at 80° C. and 85% RH. The results are presented in Table 7.

TABLE 7

| Example | Benzoyl-ferrocene | 11T mark deviation fresh | 11T land jitter fresh | 11T mark deviation 1 week | 11T land jitter 1 week |
|---|---|---|---|---|---|
| 9 | no | –78.5 ns | 30.1 ns | –85.5 ns | 40.7 ns |
| 10 | yes | –59.0 ns | 22.0 ns | –59.9 ns | 27.2 ns |
| 11 | yes | –68.1 ns | 21.2 ns | –63.6 ns | 21.3 ns |

Notice that while the benzoylferrocene improves these parameters in fresh media, it also serves to stabilize the same during incubation. As a result of the poor values of these parameters for media lacking benzoylferrocene, some readers will pick up excessive block errors on disks read after incubation for 1 week.

What is claimed is:

1. Recordable optical media comprising:

a) a transparent substrate;

b) a dye recording layer containing a metal complex of a porphyrn or phthalocyanine dye on said transparent substrate;

c) a reflective layer provided on said dye layer wherein the reflective layer comprises a mixture of silver and gold in such proportions that the gold comprises between about 0.5 and 15 atomic percent of said mixture; and d) a protective layer formed over said reflective layer.

2. The recordable optical media according to claim 1 wherein the reflective layer comprises of a mixture of about 97.8 atom percent silver and about 2.2 atom percent gold.

3. The recordable optical media according to claim 2 wherein the recording layer further comprises the additive benzoylferrocene in an amount between about 2% and 12% by weight of said recording layer.

4. The recordable optical media according to claim 1 wherein the optical recording media is a recordable compact disk.

5. The recordable optical media according to claim 3 wherein said media is a recordable compact disk.

6. The recordable optical disk according to claim 5 wherein said reflective layer is at least 500 angstroms thick.

7. The recordable optical media according to claim 1 wherein said reflective layer comprises a mixture of silver and gold in such proportions that the gold comprises between about 0.7 and 11.9 atomic percent of said mixture.

8. The recordable optical media according to claim 1 wherein said metal complex of a porphyrn or phthalocyanine dye is as described in Formulas I and II:

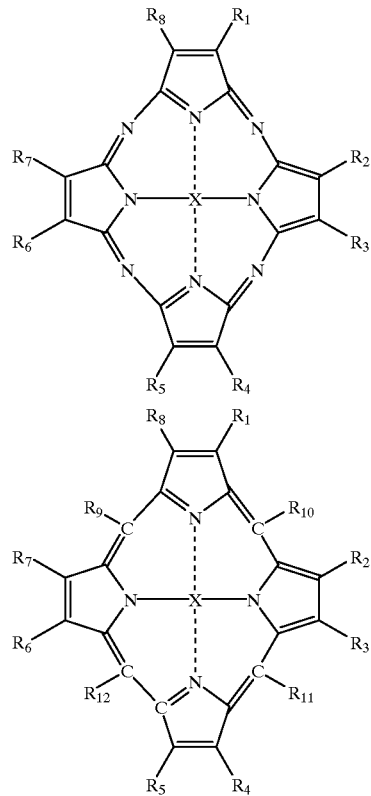

Formulas I and II wherein

X represents a metal selected from the group consisting of Mg, Al, Si, Ti, V, Mn, Fe, Co, Ni, Cu, Zn, Ga, Pd, Sn and Pb;

the R groups (1 through 12) can be the same or different and can independently be selected from hydrogen or alkyl of 1–12 carbon atoms or cycloalkyl of 6–10 carbon atoms or aryl of 6–10 carbon atoms or allyl or such alkyl, cycloalkyl, aryl and allyl groups substituted with one or more groups chosen from hydroxy, acyloxy, alkoxy, aryloxy, alkylthio, arylthio, alkylsulfonyl, arylsulfonyl, alkylaminosulfonyl, arylaminosulfonyl, thiocyano, cyano, nitro, halogen, alkoxycarbonyl, aryloxycarbonyl, acetyl, aroyl, alkylaminocarbonyl, arylaminocarbonyl, alkylaminocarbonyloxy, arylaminocarbonyloxy, acylamino, amino, alkylamino, arylamino, carboxy, sulfo, trihalomethyl, alkyl, aryl, substitiuted aryl, hetaryl, or substituted hetero aryl, alkylureido, arylureido, succinimido, phthalimido or, any two of the R groups located on adjacent ring carbons may be combined together to form a 5- or 6-membered saturated or unsaturated (aromatic) hetero- or carbocyclic ring.

9. The recordable optical media according to claim 1 wherein said metal complex of a porphyrn or phthalocyanine dye is as described in Formulas III and IV:

Formula III-IV

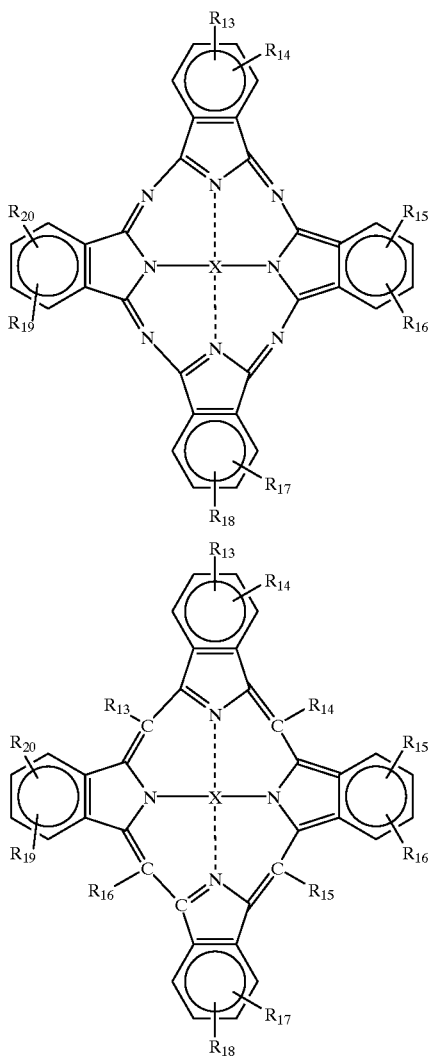

10. The recordable optical media according to claim 1 wherein said metal complex of a porphyrn or phthalocyanine dye is as described in Formulas V and VI:

Formula V-VI

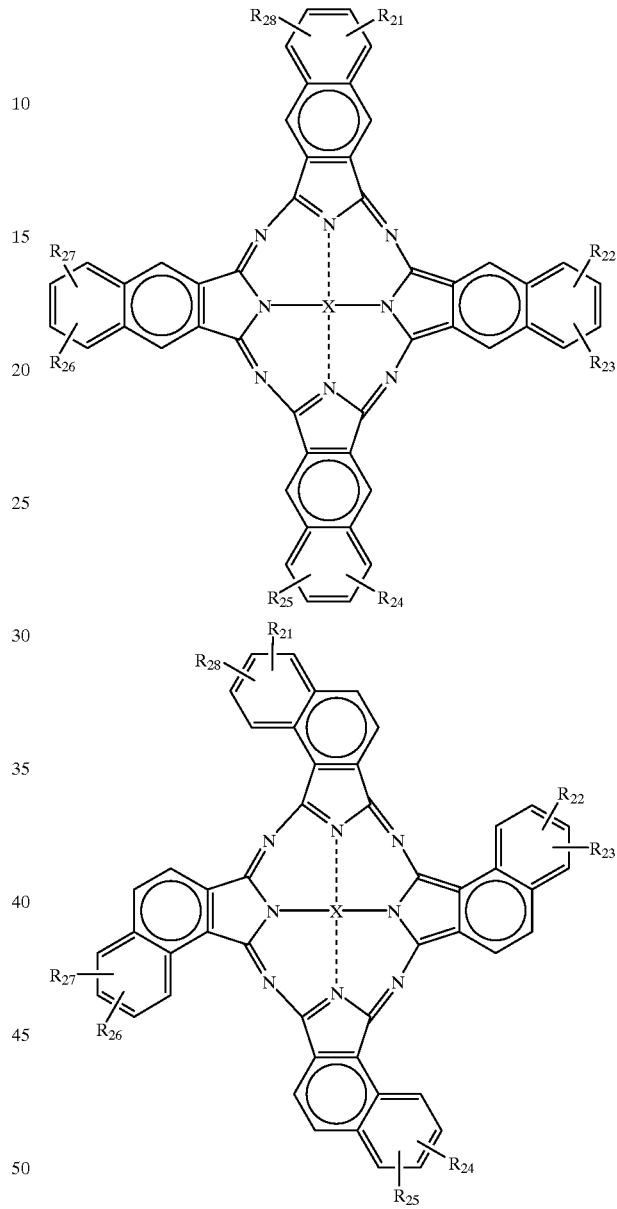

wherein
X represents a metal and is selected from the group consisting of Mg, Al, Si, Ti, V, Mn, Fe, Co, Ni, Cu, Zn, Ga, Pd, Sn and Pb;
the R groups (13 through 20) can be the same or different and can independently be selected from hydrogen or alkyl of 1–12 carbon atoms or cycloalkyl of 6–10 carbon atoms or aryl of 6–10 carbon atoms or allyl or such alkyl, cycloalkyl, aryl and allyl groups substituted with one or more groups chosen from hydroxy, acyloxy, alkoxy, aryloxy, alkylthio, arylthio, alkylsulfonyl, arylsulfonyl, alkylaminosulfonyl, arylaminosulfonyl, thiocyano, cyano, nitro, halogen, alkoxycarbonyl, aryloxycarbonyl, acetyl, aroyl, alkylaminocarbonyl, arylaminocarbonyl, alkylaminocarbonyloxy, arylaminocarbonyloxy, acylamino, amino, alkylamino, arylamino, carboxy, sulfo, trihalomethyl, alkyl, aryl, substitiuted aryl, hetaryl, or substituted hetero aryl, alkylureido, arylureido, succinimido, phthalimido or,
any two of the R groups located on adjacent ring carbons may be combined together to form a 5- or 6-membered saturated or unsaturated (aromatic) hetero- or carbocyclic ring.

wherein
X represents a metal selected from the group consisting of Mg, Al, Si, Ti, V, Mn, Fe, Co, Ni, Cu, Zn, Ga, Pd, Sn and Pb;
the R groups (21 through 28) can be the same or different and can independently be selected from hydrogen or alkyl of 1–12 carbon atoms or cycloalkyl of 6–10 carbon atoms or aryl of 6–10 carbon atoms or allyl or such alkyl, cycloalkyl, aryl and allyl groups substituted with one or more groups chosen from hydroxy, acyloxy, alkoxy, aryloxy, alkylthio, arylthio, alkylsulfonyl, arylsulfonyl, alkylaminosulfonyl, arylaminosulfonyl, thiocyano, cyano, nitro, halogen, alkoxycarbonyl, aryloxycarbonyl, acetyl, aroyl, alkylaminocarbonyl, arylaminocarbonyl, alkylaminocarbonyloxy, arylaminocarbonyloxy, acylamino, amino, alkylamino, arylamino, carboxy, sulfo, trihalomethyl, alkyl, aryl, substitiuted aryl, hetaryl, or substituted hetero aryl, alkylureido, arylureido, succinimido, and phthalimido.

* * * * *